United States Patent [19]

Smith

[11] 4,433,418
[45] Feb. 21, 1984

[54] OFF-AXIS ASTIGMATIC UNSTABLE LASER RESONATOR

[75] Inventor: Irl W. Smith, Newton, Mass.

[73] Assignee: Raytheon Company, Lexington, MA

[21] Appl. No.: 232,085

[22] Filed: Feb. 6, 1981

[51] Int. Cl.³ ............................................... H01S 3/08
[52] U.S. Cl. ........................................ 372/95; 372/98
[58] Field of Search ............... 372/95, 92, 97, 102, 372/98

[56] References Cited

U.S. PATENT DOCUMENTS

| | | | |
|---|---|---|---|
| 4,079,340 | 3/1978 | Weiner et al. | 372/95 |
| 4,216,439 | 8/1980 | Pond et al. | 372/102 |
| 4,239,341 | 12/1980 | Cason et al. | 372/95 |

OTHER PUBLICATIONS

"Off-Axis Unstable Laser Resonator:Operation" by Reilly et al.; App. Optics, vol. 15, No. 9, pp. 2159–2166, Sep. 1976.
"Use of Unstable Resonators in Achieving the Diffraction Divergence of the Radiation Emitted from High--Gain Pulsed Gas Lasers" Zemskov et al. Sov. Jour. Quant. Elect. vol. 4, No. 4, Oct. 1974.

*Primary Examiner*—William L. Sikes
*Assistant Examiner*—Léon Scott, Jr.
*Attorney, Agent, or Firm*—Richard M. Sharkansky; Joseph D. Pannone

[57] ABSTRACT

A laser system having an optically unstable cavity with a unique optical center axis longitudinally offset from the center axis of the cavity toward one side of the resonator to obtain an unobscured output beam from the opposite side. The resonator also has astigmatic magnification which provides for a greater volume utilization of the gain medium than otherwise possible. In a preferred embodiment, the off-axis astigmatic resonator employs spherical mirrors at off-normal incidence to provide for different magnification in two orthogonal planes.

11 Claims, 6 Drawing Figures

4,433,418

OFF-AXIS ASTIGMATIC UNSTABLE LASER RESONATOR

BACKGROUND OF THE INVENTION

Optical resonators used in high-energy and high-power applications have resulted in optical structures characterized by a high Fresnel number. This leads to poor mode control and low far-field brightness. Additionally, in a high Fresnel number resonator, some local transient inhomogeneity of the resonator-gain medium system can cause optical energy to become concentrated in hot spots which lead to a degradation of the gain medium and of the optical surfaces. These transient concentrations of energy cannot be readily controlled since the geometry of the resonator is such that smoothing of the energy in the beam due to diffraction is very slow. To overcome these problems, unstable resonators have been used. They provide transverse mode selection by increasing the transverse diffusion of light within the resonator and increases efficiency by using the energy lost to diffraction as the output beam.

A problem of typical unstable resonators in that they give rise to an annular output beam. This produces a low far-field brightness which limits the usefulness of these configurations.

Another problem found in unstable resonators is that the threshold gain of the active medium within such resonators has a complex periodic oscillation as a function of the magnification and other parameters.

Unstable resonators that employ a structure leading to a non-annular output beam have used structures having multiple optic axes which can give rise to a non-uniphase output beam due to the different contributions of each optic axis.

A further problem found with these unstable resonators is the poor volumetric efficiency obtainable as a result of the low volume utilization of the gain medium. Much of the gain medium is not traversed by any portion of the output beam because of the geometry of typical unstable resonator and the gain medium within it.

SUMMARY OF THE INVENTION

The present invention discloses a confocal unstable optical cavity using an off-axis and astigmatic structure to alleviate, respectively, the low far-field brightness and the low gain-medium utilization problems. As used herein, the term confocal refers to the coincidence of the focal points of the curved optical surfaces that define the resonant cavity when the surfaces are aligned along the same axis. The term unstable refers to the characteristic of the cavity which causes the rays within the cavity to diverge, or walk away, farther from the optical center of the cavity with each succeeding pass. The characteristic is used to obtain an output beam as the rays finally miss one of the reflecting surfaces. The term astigmatic refers to the characteristic of an optical surface of providing different focal points for rays in different axial planes.

In accordance with this invention, there is provided a gain medium and means surrounding the gain medium for forming a resonant cavity and for producing an output beam having an unobstructed cross-section of in-phase wave components. Preferably, the cavity forming means comprise means for forming a confocal unstable resonator having a single optic axis substantially along a longitudinal edge of the resonator. Additionally, the resonator forming means comprise reflecting means having non-zero principal curvatures along two orthogonal planes. In a preferred embodiment, the reflecting means have identical principal curvatures.

Further in accordance with the invention, there is provided a gain medium, means surrounding said gain medium for forming a resonant cavity and means for increasing volumetric efficiency of the cavity, which perferably comprise means having astigmatic magnification. In a preferred embodiment, the astigmatic means comprise spherical elements disposed with their planes substantially non-orthogonal to the optic axis of the resonator.

This invention further discloses a gain medium, means surrounding the gain medium for forming a resonant cavity and providing an output beam having an unobstructed cross-section of in-phase components, and means for increasing the volumetric efficiency of the cavity. Preferably, the cavity forming means comprise means for forming a confocal unstable resonator having a single optic axis substantially along a longitudinal edge of the resonator, and the volumetric efficiency increasing means comprise means having astigmatic magnification.

The invention also provides for first reflecting means, second reflecting means for forming, in cooperation with the first reflecting means, an off-axis unstable optical cavity having a unique optic axis and a gain medium disposed between them. The first and second means may comprise optics having two non-zero principal radii of curvature for providing astigmatic magnification. Preferably, the first and second means may comprise respectively first and second spherical mirrors disposed adjacent to each other at off-normal incidence with respect to the optical axis of the cavity to use astigmatic magnification and first and second plane mirrors, each adjacent to a corresponding one of the spherical mirrors and disposed at the sides of said optic axis to form an unstable resonator. Additionally, one of the spherical mirrors may be convex and the other concave.

BRIEF DESCRIPTION OF THE DRAWINGS

Other objects and advantages of the invention will be better understood from the following detailed description used in conjunction with the drawings in which like reference numbers refer to like parts or items and in which.

DESCRIPTION OF THE PREFERRED EMBODIMENT

Figure 1:
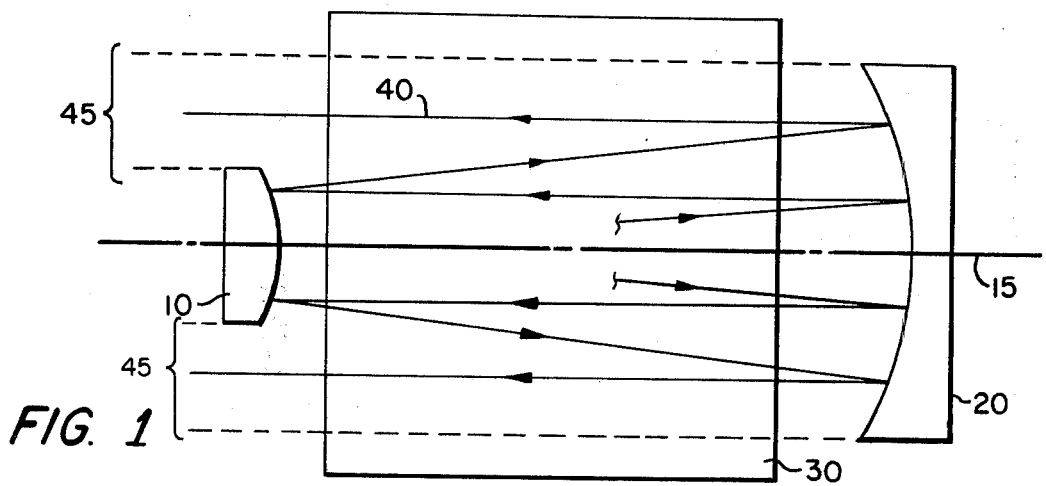
FIG. 1 illustrates an on-axis unstable laser resonator having an annular output beam.
Figure 2:
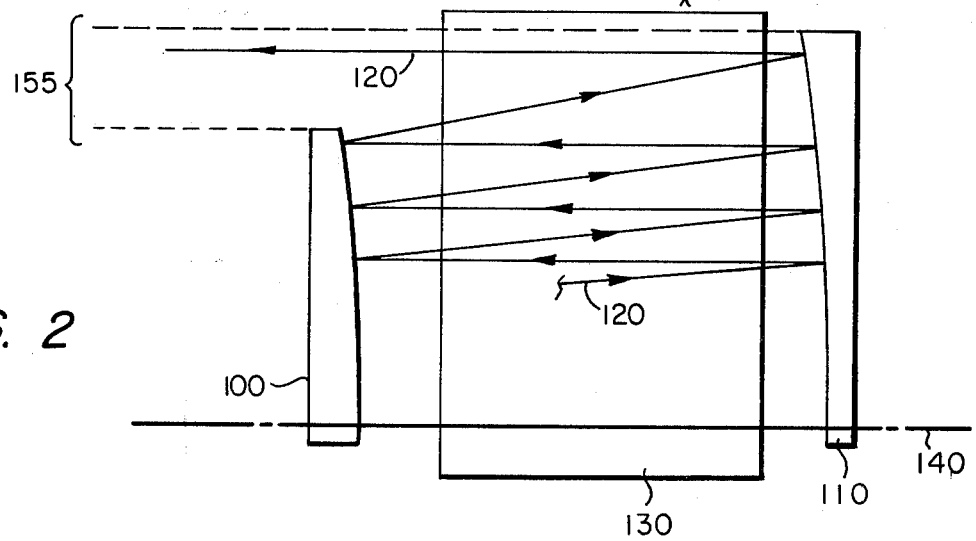
FIG. 2 illustrates an off-axis unstable laser resonator utilizing the principles of the present invention.
Figure 3A:
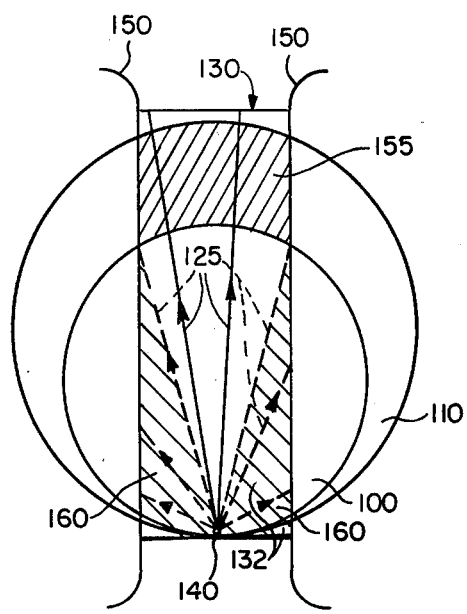
FIG. 3a represents a transverse section of the laser resonator of FIG. 2 showing the area of non-utilization of the gain medium between the two electrodes.

Referring now to FIG. 1, there is shown an unstable laser resonator system having an optical resonant cavity formed by convex mirror 10 and concave mirror 20 surrounding a contained gain medium 30. Mirrors 10 and 20 are spherical and have their centers of curvature lying on the center axis of the overall structure; thus the optical axis 15 coincides with this center axis. The details of the laser, of which gain medium 30 is part, are not shown. Gain medium 30 is made to exhibit gain by conventional means, for instance by discharging a pulse of electrical energy through electrodes transverse to the center axis in a mixture of $CO_2$, $N_2$ and He. The generated waves of electromagnetic energy, exemplified by typical ray 40, reflect back and forth between mirrors 10 and 20 traveling further away from the optical center line with each pass until they miss mirror 10 and appear at the edge of mirror 10 as an annular output beam 45 of the laser. When the focal point of mirror 20 coincides with the focal point of mirror 10, the arrangement is called confocal and the output beam is collimated. This annular output beam leads to a far-field intensity pattern consisting of alternate light and dark rings, and this results in low far-field brightness. To remedy the brightness problems of the symmetric annular output resonator system just described, a different structure is provided, as shown in FIG. 2. This unstable resonator system is formed by convex mirror 100 and concave mirror 110. They define a non-cylindrical system having a unique optical center axis 140 which is no longer along the center axis of the structure, but is displaced to a line near one longitudinal edge of the resonator. An important advantage of the resonator of FIGS. 2 and 3a over other configurations is that by having a unique optical axis, the output beam is uni-phase since the contributions from the only optic center axis are all in phase. Mirrors 100 and 110 enclose a gain medium 130 that is part of a laser as described above for a conventional resonator. When gain medium 130 is pumped, the generated electromagnetic waves, as represented by typical ray 120, are reflected back and forth from the optical center line between mirrors 100 and 110. The rays travel away from the optical center line and they eventually spill around the edge of mirror 100, forming the output beam 155 of the laser system. A transverse sectional of the resonator system of FIG. 2 is shown in FIG. 3a. A portion of laser electrodes 150 are shown as further defining the volume where gain medium 130 is confined, even though the supporting structure is not shown for clarity. Gain medium 130, electrodes 150, mirrors 100 and 110 are the only elements shown. However, they form, and are a part of, a conventional transverse excitation atmospheric type laser commonly referred to as TEA laser. As the rays reflect between mirrors 100 and 110 they tend to diverge from the optical center line in all directions. As shown in FIG. 3a, the location of the optical center axis 140 in relation to the overall structure and the location of laser electrodes 150 serve to restrict the volume in which the resonating rays can receive gain as they diverge from the optical center. In this off-axis unstable resonator, the output beam 155 of the laser system emerges from a smaller top portion of the edge of mirror 100 instead of from the entire edge as is done in a conventional unstable resonator and thus results in an unobscured output beam resonator. A square output beam can be achieved by appropriate placement of stops, not shown. This square output beam does not have a hole in its center and therefore has greatly increased far-field brightness.

Figure 5:
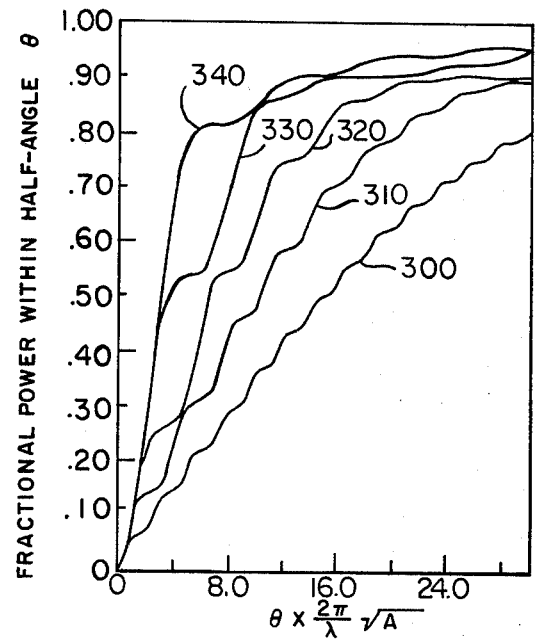
FIG. 5 shows a plot of fractional power within a solid angle as a function of the far-field angle for various annular and square configurations.

The far-field intensity pattern of the resonators of FIGS. 1 and 2 may be approximated by a Fraunhofer diffraction pattern of a uniformly illuminated annular and square aperture, respectively. FIG. 5 shows the results of such an approximation for annular apertures corresponding to various output couplings and for a square aperture of the same area irrespective of coupling. The quantity plotted is the fraction of the total power within an angle $\theta$ of the center axis as a function of $\theta K A^{\frac{1}{2}}$, where $K = 2\pi/\lambda$ is the wave number and A is the area of aperture. Lines 300–330 are for an annular aperture of a predetermined area corresponding to, respectively, 15%, 30%, 50% and 80% output coupling. The output coupling is defined as the ratio of the radii of the mirrors forming the resonator. Line 340 is for a square aperture of the same area. As it can be seen, the square aperture has a much cleaner, more concentrated far-field pattern. In fact, for the 15-30 percent output coupling range, which is typical for a TEA $CO_2$ type of laser, the diameter of the transmitting telescope has to be four times larger for the annular beam than for the square beam to get 80 percent of the transmitted energy in the same solid angle.

The off-axis unstable resonator of FIG. 2, as well as the resonator of FIG. 1, has a large portion of the gain medium that is not used to transfer energy to the diverging resonant beam due to the geometric construction of the laser. FIG. 3a shows the unused gain medium area as wasted area 160 for the resonator system of the present system. The resonator of FIG. 1 has a similar wasted area, not shown, that is symmetric on two axes since the optical center is moved back to coincide with the geometric center axis. By making the magnification in the horizontal direction, $M_h$, different from that in the vertical direction, $M_v$, more of the gain medium volume is used than otherwise possible. The trajectory of a point $(x_o, y_o)$ on the wavefront on successive round trips of the resonator is given for n round trips by:

$$x_n = M_h x_{n-1} = M_h^2 x_{n-2} \cdots = M_H^n x_o$$

Similarly, $$y_n = M_v^n y_o$$

If the magnification in the vertical direction is greater than the magnification in the horizontal direction, then $$M_V = M_H^q, \quad q > 1.$$

Substituting this into the previous relation yields:

$$y_n = M_V^n y_o = M_H^{qn} x_o^q y_o / x_o^q = x_n^q (y_o / x_o^q)$$

Figure 3B:
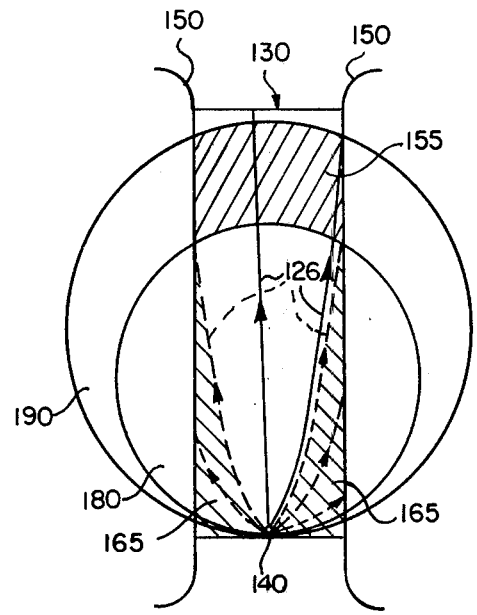
FIG. 3b shows the greater utilization of the gain medium due to the effect of astigmatic magnification.

Setting $q = 2$ this last relation becomes the formulation for a parabola, and it results in a bigger utilization of the gain medium for a predetermined size of output beam 155 as shown in FIG. 3b. In fact, wasted area 165, is just $1/(q+1)$ of the total area for a rectangular cross-section, which is the cross-section for the gain medium between the parallel laser electrodes 150. In FIGS. 3a and 3b, lines 125 and 126, respectively, represent a sample of these trajectories for the two resonators. The solid lines show the range of trajectories that contribute to the output beam, while the dashed lines show the trajectories in the wasted areas 160 and 165 that do not contribute to the output beam. Thus, it can be seen that by going to an off-axis astigmatic unstable resonator the problem of low far-field brightness can be avoided while the utilization of the gain medium is increased. To achieve the required astigmatic magnification, the astigmatic off-axis resonator of FIG. 3b has to use long radius aspheric mirrors 180 and 190. Each aspheric mirror has two different finite radii or non-zero principal curvatures. Such toroidal mirrors are expensive and difficult to fabricate since they cannot be formed simply by grinding two complementary surfaces together.

Figure 4:
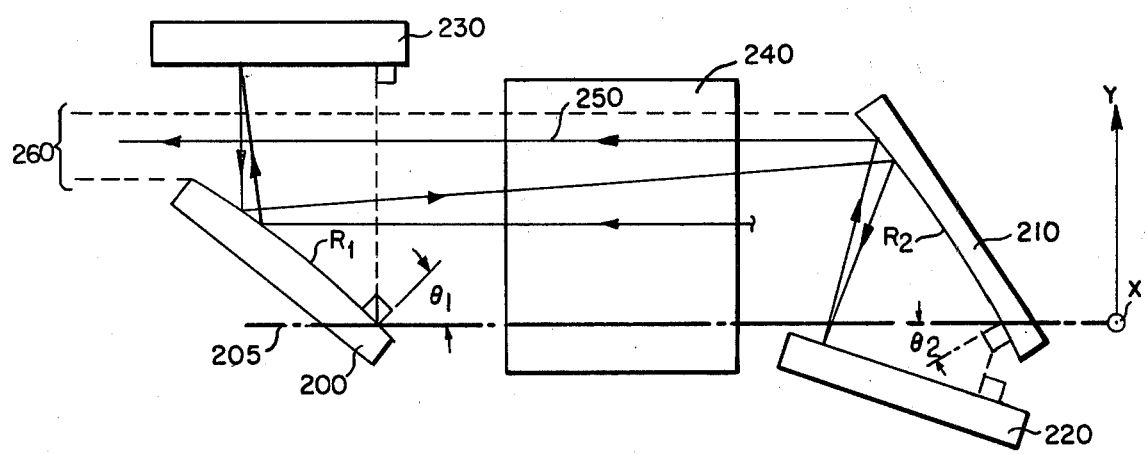
FIG. 4 shows an embodiment of the invention employing only spherical and plane mirrors.

Turning now to FIG. 4, there is shown off-axis astigmatic resonator configuration that avoids the problem of aspheric mirrors. Mirrors 200, 210, 220 and 230 form the off-axis unstable resonant cavity having an output beam 260, which is similar to the output beam 155 of the resonator of FIG. 3b, and having gain medium 240 positioned between mirrors 200 and 210. Electrodes and pumping mechanism to form a laser are not shown, since they are of the conventional type as described above. Mirrors 200 and 210 are spherical mirrors and they are used at off-normal incidence to provide astigmatic magnification. Their planes form angles $\theta_1$ and $\theta_2$ with respect to the optical center axis 205. This configuration makes use of the fact that the focal lengths, $f_t$ and $f_s$ for tangential and sagittal rays respectively, have the following relationship:

$$f_t = f_o \cos \theta$$

$$f_s = f_o / \cos \theta$$

where $\theta$ is the angle of incidence and $f_o$ is the normal-incidence focal length. Spherical mirrors can be characterized as a special case of aspherical mirrors in that the two principal curvatures are identical. Plane mirrors 230 and 220 are used to complete the unstable resonant cavity. In general, an unstable resonator system has a pair of points $P_1$ and $P_2$ such that both mirrors image $P_1$ onto $P_2$. For an astigmatic system, the points $P_1$ and $P_2$, which are imaged onto themselves, separate into two pairs of line foci. However, in the system of FIG. 4, the radii $R_1$ and $R_2$ of spherical mirrors 200 and 210 and the two angles of incidence $\theta_1$ and $\theta_2$ can be selected so as to make one of the pairs of line foci degenerate to a stigmatic point. If the radii define a confocal resonator, then this stigmatic point lies at infinity, and the output is in the form of a collimated in-phase beam. This system is an astigmatic confocal unstable resonator. It is astigmatic because the wavefronts of the resonant electromanetic wave are of unequal principal radii, and it is confocal because the tangential foci of the two end mirrors coincide, as do the sagittal foci, even though the tangential foci do not coincide with the sagittal.

Another important advantage of the system of FIG. 4 is that it effectively eliminates the periodic loss variation characteristic of unstable resonators. A complex periodic oscillation of the gain as a function of magnification and other parameters is normally found to be present in unstable resonators of the prior art. An explanation for this is as follows. Some of the light which escapes from the resonator is diffracted and scattered at the edge of the output mirror. If any light is scattered by exactly 180° it will fall into the converging mode. Its transverse coordinates will be demagnified at each round trip while its intensity increases. It will thus arrive at the optical axis of the resonator in sufficient strength to interfere with the existing mode. It interferes constructively or destructively, depending on its phase with respect to the existing mode, and then it begins to spread out again through diffraction. If the interference is destructive a high intensity at the output mirror's edge will be favored, representing a mode with low-on axis intensity, high edge intensity and high loss. Conversely, if the interference is constructive, the mode loss will be low. This variation in loss can thus be understood in terms of an equivalent Fresnel number defined as the distance in half-wavelengths between the edge of the output mirror and the phasefront of the outgoing wave which just touches the center of the mirror. Calculations of losses have shown that for mirrors with sharp edges perpendicular to the output beam a very periodic relationship develops. The arrangement of mirrors 200 and 210 in FIG. 4 results in an output edge that is tilted and curved and therefore it will extend many times the half-wavelength in the direction of the output beam. This effectively smears out and eliminates the period loss variations mentioned above.

Another advantage of the resonator of FIG. 4 is the ease of supporting the output mirror 200 since the output beam leaves the cavity only over part of the circumference of the mirror. For a conventional annular output beam resonator the problem of mechanically supporting the output mirror without blocking some of the output beam is a difficult problem.

A further advantage of the resonator of FIG. 4 is that a mirror readjustment of the mirror tilt angles $\theta_1$ and $\theta_2$ moves the optical center line 205 beyond the edge of one of the mirrors, thus making it possible to inject an external beam into the resonator.

In one embodiment of the resonator to FIG. 4, the following specifications are used, for mirror 200, $R_1$ is $-1787$ inches and $\theta_1$ is 45°, and for mirror 210, $R_2$ is 1997 inches and $\theta_2$ is 42.9. The total single-pass optical path-length for a typical ray is 50 inches, including reflections from end mirrors 220 and 230. The resulting astigmatic magnification ratio in the y to x plane is 2, with the x and y planes defined, respectively, perpendicular and parallel to the plane of the drawing.

Even though a transverse electric atmospheric laser has been described in conjunction with the preferred embodiments, it is understood that other laser apparatus can be used and still fall within the teachings of the present invention. Other modifications to the described embodiments will be apparent to persons skilled in the art without departing from the spirit and scope of this invention. Accordingly, it is intended that this invention be not limited except as defined by the appended claims.

What is claimed is:

1. In combination:
a gain medium;
means, including a resonant cavity and having disposed in such cavity the gain medium, for urging electromagnetic waves in said cavity and passing through the gain medium outwardly in a predetermined direction towards a predetermined peripheral portion of the gain medium; and,
wherein the urging means has an astigmatic aberration, such aberration having a greater magnification along the predetermined direction than along a direction perpendicular to said predetermined direction.

2. The combination of claim 1 wherein:
said cavity forming means comprise means for forming an unstable resonator having a single optic axis substantially along a longitudinal edge of said resonator.

3. The combination of claim 2 wherein:
said resonator forming means comprise reflecting means having non-zero principal curvatures along two orthogonal planes.

4. The combination of claim 3 wherein:

said reflecting means comprise a pair of reflectors each of whose principal curvatures are identical.

5. The combination of claim 4 wherein:
said reflector means comprise spherical elements disposed with their planes substantially non-orthogonal to the optic axis of said resonator.

6. In combination:
a gain medium;
means, including a resonant cavity, for producing an output beam emerging from a predetermined peripheral portion of the gain medium having a substantially unobstructed cross-section of the in-phase components; and
means for increasing the volumetric efficiency of said cavity comprising means having astigmatic magnification with principal planes thereof along a predetermined direction related to the position of said peripheral portion of the gain medium.

7. The combination of claim 6 wherein:
said cavity forming means comprise means for forming an unstable resonator having a single optic axis substantially along a longitudinal edge of said resonator.

8. In combination:
first and second reflecting means for forming an unstable optical cavity having a unique optic axis; and
a gain medium disposed between said first and second reflecting means, said first and second reflecting means comprising optics having two non-zero principal radii of curvature, said first and second reflecting means having astigmatic magnification in a direction having a predetermined relationship to an output beam produced by the optical cavity.

9. The combination of claim 8 wherein:
said first and second reflecting means comprise respectively first and second spherical mirrors, disposed adjacent to each other at off-normal incidence with respect to the optical axis of said cavity and first and second plane mirrors, each adjacent to a corresponding one of said spherical mirrors and to the side of said optical axis to form an unstable resonator.

10. The combination of claim 9 wherein:
said first spherical mirror is convex; and
said second spherical mirror is concave.

11. An unstable resonator wherein electromagnetic waves passing through a gain medium in said resonator diverge further from an inner region of the cavity with each succeeding pass through the cavity to a peripheral portion of the cavity to produce an output beam from the peripheral portion of said cavity, said resonator comprising means disposed at opposite ends of the cavity, said means having astigmatic aberration with a greater magnification along the direction in which the waves diverge from the inner region of the cavity towards the peripheral portion of the cavity than the magnification perpendicular to said direction.

* * * * *